May 1, 1962 G. P. McCORD 3,032,091

VALVE

Filed May 11, 1961

INVENTOR.
GEORGIE P. McCORD
BY
Arthur L. Whinston
ATTORNEY.

United States Patent Office 3,032,091
Patented May 1, 1962

3,032,091
VALVE
Georgie P. McCord, Indianapolis, Ind., assignor to United States Rubber Company, a corporation of New Jersey
Filed May 11, 1961, Ser. No. 109,454
5 Claims. (Cl. 152—427)

This invention relates to a valve stem assembly for a tubeless tire and rim.

There are a number of such valve stem assemblies currently on the market, but despite the relative simplicity thereof, they are nevertheless expensive to manufacture. Additionally, most of them depend for their effectiveness upon a rubber-to-metal bond, which, it will be understood by those skilled in the art, is difficult to achieve and maintain.

Accordingly, it is an object of the present invention to provide a valve stem assembly for a tubeless tire and rim that does not depend upon any rubber-to-metal bond and that consequently, eliminates the problems associated therewith. It is a further object of the present invention to provide such a valve in which expensive metal parts are replaceable by molded plastic parts. It is a further object of the present invention to provide such a valve in which the regular valve core is eliminated and replaced by a much simpler mechanism.

The instant invention achieves these objects by providing a valve assembly comprising a resilient rubber grommet adapted to fit within the standard valve stem opening in the usual tubeless tire rim. To be thus accommodated, the grommet has an outer diameter substantially greater than the diameter of the opening and, additionally, may have a circumferentially extending groove in its outer surface intermediate its ends into which the edge of the rim surrounding the opening can fit. Thus, the grommet fits into the opening in the rim, with the inner end thereof extending into the air chamber.

The grommet is provided with a plurality of axially extending passageways, which passageways extend inwardly from its inner end. There is also an inwardly disposed, axially extending cylindrical recess communicating directly with the above mentioned passageways.

The material of the inner end of the grommet forms an inwardly disposed spherical protrusion which extends into the above mentioned cylindrical recess. This protrusion is adapted to provide the necessary fluid-tight seal. The protrusion is an integral part of the rubber grommet. The grommet is further provided with a second axially extending passageway, this passageway extending inwardly from its outer or other end and also communicating with the cylindrical recess.

A rigid tubular member, which may be readily molded from a suitable plastic material, is disposed within this second passageway. The tubular member is itself adapted to receive a valve pin and is further adapted to cooperate with the above mentioned spherical protrusion in order to effect the above mentioned fluid-tight seal.

A valve pin is axially disposed within the tubular member, the valve pin being adapted to retractably depress the spherical protrusion, thereby to break the fluid seal. Thus, the pin permits the valve to be aired and gauged the same as current standard valves. Means are also provided to retain the valve pin within the tubular member, such means desirably comprising a flange on the inner surface of the tubular member and a projection on the surface of the pin. The valve is further adapted to receive the regular sealing or dust cap.

Other objects and advantages of the invention will become apparent from the following description, when read in conjunction with the accompanying drawing wherein.

Figure 1:
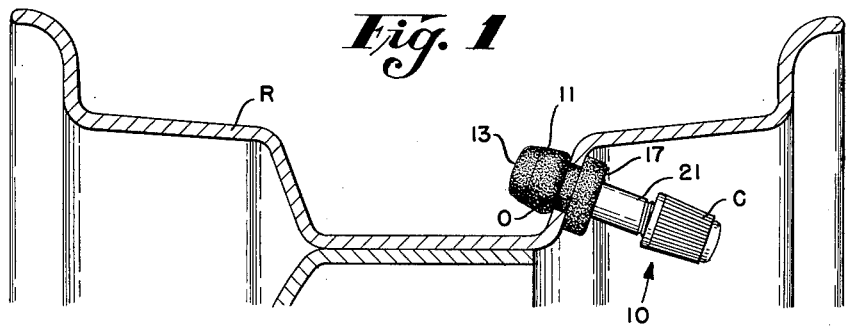
FIG. 1 is a sectional view of a rim for a tubeless tire showing the valve of the present invention installed in the usual valve stem opening through the rim.

Referring to the drawings and in particular to FIGS. 1, 2, 5 and 6, the valve of the instant invention, generally designated by reference 10, comprises a resilient rubber grommet 11 preferably having a circumferentially extending groove 12 formed in the outer surface thereof intermediate its ends. The edge of a tubeless tire rim R surrounding the usual valve stem opening O fits in groove 12 when valve 10 is installed in opening O.

In order to provide the required fluid-tight seal, the outer diameter of valve 10 is made substantially greater than the diameter of opening O, as will be obvious to those skilled in the art. Thus, where a groove 12 is provided, the base diameter of the same is made slightly larger than the diameter of valve stem opening O and the width of groove 12 is preferably slightly smaller than the rim thickness, so that when the valve 10 is installed in the opening O, the resilient rubber surrounding groove 12 will be placed under compression, thereby providing effective sealing between the valve and rim R.

The provision of groove 12, although preferable, is not absolutely necessary, however. The outer surface of grommet 11 can also be made smooth and of a size that can be forced into opening O so as to compress the resilient rubber of the grommet into sealing engagement therewith.

Figure 4:
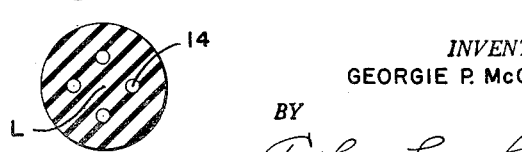
FIG. 4 is a sectional view taken on line IV—IV of FIG. 2.

The inner end 13 of grommet 11 is provided with a plurality of axially extending passageways 14, which extend interiorly into the rubber. Passageways 14 are formed as relatively fine holes molded into the rubber and their longitudinal axes are preferably radially equidistant from the longitudinal axis L of grommet 11. Four such passageways 14 have been found satisfactory, as illustrated in FIG. 4.

A cylindrical recess 15 is also molded within grommet 11. This is clearly shown in FIG. 6. The axis of recess 15 is concurrent with the longitudinal axis L of the grommet itself and the recess is formed so that the interior ends of passageways 14 communicate directly therewith.

Grommet 11 is further provided with a second axially extending passageway 16. This passageway extends inwardly from the outer end 17 of the grommet and also communicates with recess 15. Recess 15 is formed of a length that is relatively short in comparison with the length of passageway 16.

Figure 2:
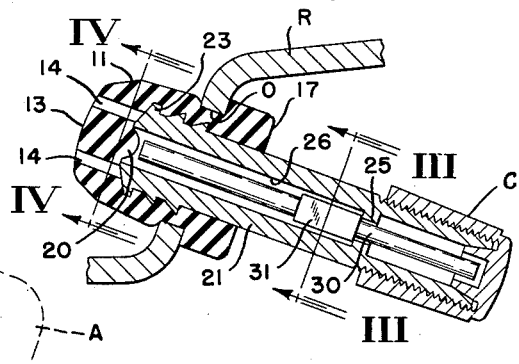
FIG. 2 is an enlarged sectional view of a valve and a portion of the rim, showing all passageways sealed against flow of fluid.
Figure 6:
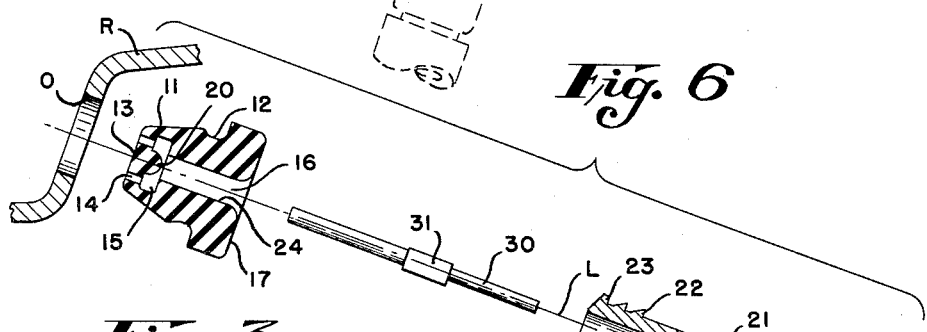
FIG. 6 is an exploded sectional view of the valve stem assembly of the instant invention.

The grommet is molded so that the material of its inner end forms an inwardly disposed spherical protrusion 20, as best shown in FIGS. 2 and 6. Protrusion 20 extends into recess 15 as shown and is adapted to provide the necessary fluid-tight seal. The protrusion is preferably formed as an integral part of the rubber.

The valve body is formed as a rigid tubular member 21. Tubular member 21 may be readily molded from any suitable rigid plastic material. The member is disposed within passageway 16 of grommet 11 and is so designed as to form, with spherical protrusion 20, a fluid-tight seal between passageways 14 and 16. Member 21 is preferably provided with a series of flanges 22, including an enlarged end flange 23. Flanges 22 are adapted to grip the inner surface 24 of passageway 16 and flange 23 is adapted to fit within recess 15, thus to securely anchor member 21 within grommet 11. When thus installed, flange 23 of member 21 contacts spherical protrusion 20 and seals off passageways 14, as best shown in FIG. 2, thus to form the necessary fluid seal.

Figure 3:
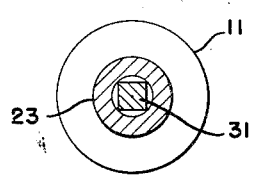
FIG. 3 is a sectional view taken on line III—III of FIG. 2.

A valve or depressor pin 30 is adapted to fit within tubular member 21, as shown. Pin 30 is preferably formed of generally cylindrical shape and is desirably provided with a stop 31 positioned at a point along its length. (See FIGS. 3 and 6.) When installed in member 21, pin 30 adopts the position shown in FIG. 2. Stop 31 rests up against a radially extending annular flange 25 formed on the inner surface 26 of member 21. Stop 31 is shown in FIG. 3 as having a square cross-section. However, it is not necessarily restricted to this design. Any shape that will align pin 30 within member 21 and permit free passage of air therethrough is satisfactory. Pin 30 may also be desirably molded from any suitable rigid plastic material.

Figure 5:
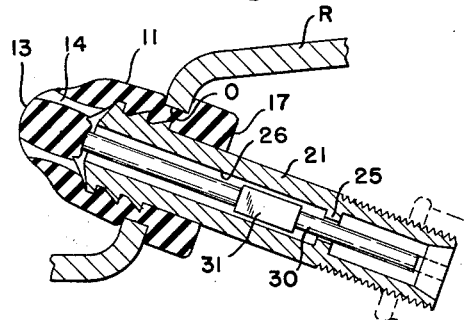
FIG. 5 is another enlarged sectional view of the valve and a portion of the rim, this view showing the valve pin depressed and in contact with the spherical protrusion, thereby breaking the fluid seal.

When the above-described fluid-tight seal is to be broken, as when the valve is to be aired or gauged, pin 30 is forced inwardly (as by the air hose A, shown in phantom in FIG. 5). Such action causes spherical protrusion 20 to be depressed, also as shown in FIG. 5. Pushing spherical protrusion 20 away from flange 23 of member 21 breaks the fluid seal and permits the inflating medium to pass through the passageways 14 and 16.

Member 21 is threaded at its outer end to enable it to receive the standard sealing or dust cap C. (See FIGS. 1 and 2.)

The term "rubber" is used in this description and in the claims in its generic sense to denote natural rubber, synthetic rubber or blends thereof.

While a certain embodiment of the invention has been shown and described, it is to be understood that this is for the purpose of illustration only and that changes and modifications can be made therein without departing from the spirit and scope of the invention.

Having thus described my invention, what I claim and desire to protect by Letters Patent is:

1. In combination, a rim having a valve stem opening therethrough and a valve assembly in said opening, said valve assembly comprising a resilient rubber grommet having an outer diameter substantially greater than the diameter of said opening in said rim, said grommet being inserted in said opening so that the material of said grommet is compressed into sealing engagement therewith, the inner end of said grommet extending into the air chamber defined by said rim, said grommet having a plurality of axially extending first passageways extending from said inner end interiorly into said grommet and an axially extending cylindrical recess located within the body of said grommet and communicating directly with the interior ends of said first passageways, the material of said inner end of said grommet forming a spherical protrusion extending into said recess, said grommet being further provided with a second axially extending passageway extending inwardly from its outer end and communicating with said recess; a rigid tubular member adapted to receive a valve pin received in said second passageway, said tubular member being adapted to cooperate with said spherical protrusion thereby to effect a fluid-tight seal between said first passageways and said second passageway; a valve pin axially disposed within said tubular member, said valve pin being adapted to retractably depress said spherical protrusion and thereby break said fluid-tight seal; and stop means adapted to retain said valve pin within said tubular member.

2. The combination of claim 1, in which said first passageways in said grommet comprise a plurality of relatively fine holes, the longitudinal axes of which are radially equidistant from the longitudinal axis of said grommet.

3. The combination of claim 1, in which the length of said cylindrical recess in said grommet is relatively short in comparison with the length of said second axially extending passageway.

4. The combination of claim 1, in which said stop means comprise a radially extending annular flange disposed on the inner surface of said tubular member and a cooperating projection disposed on the surface of said valve pin.

5. The combination of claim 4, in which said projection is square in cross-section.

References Cited in the file of this patent

UNITED STATES PATENTS

| | | |
|---|---|---|
| 2,094,264 | Crowley | Sept. 28, 1937 |
| 2,103,822 | Perry | Dec. 28, 1937 |
| 2,839,120 | McCord | June 17, 1958 |